May 18, 1926.
R. C. MORRIS
SPRING
Filed Oct. 1, 1923
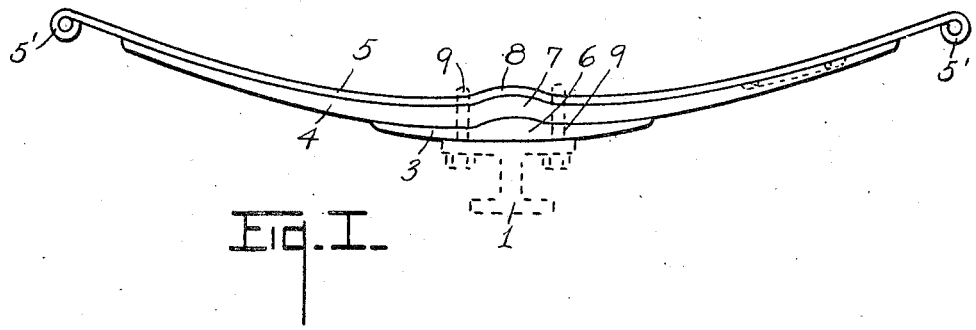
Fig. I.
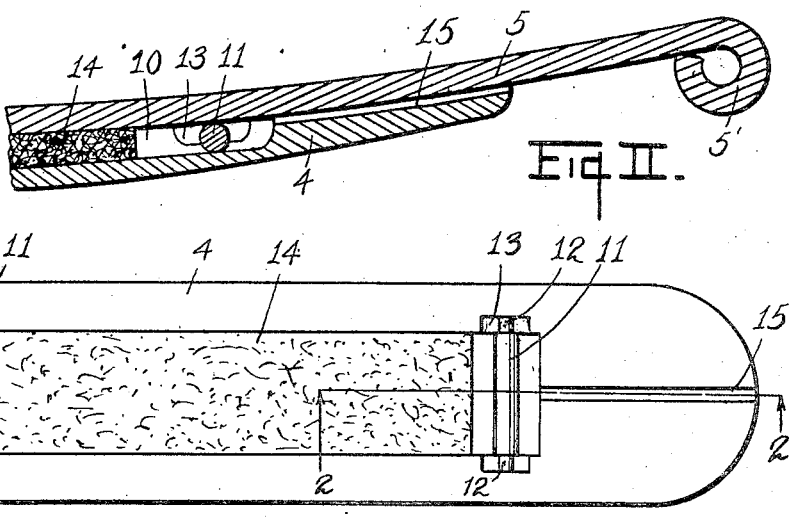
Fig. II.
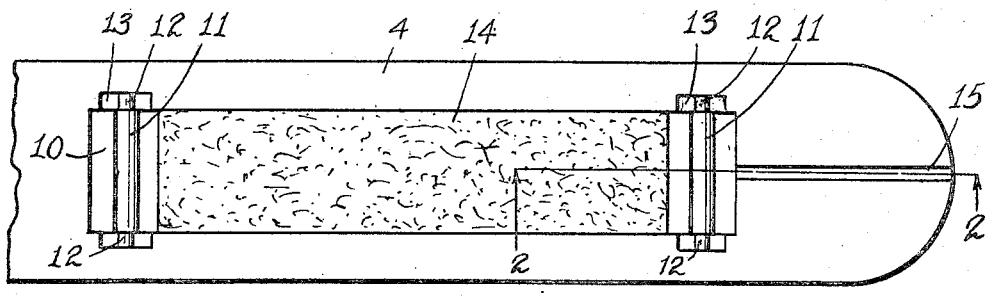
Fig. III.
Inventor
Raymond C. Morris
By Chappell & Earl
Attorneys Patented May 18, 1926.

1,584,989

UNITED STATES PATENT OFFICE.

RAYMOND C. MORRIS, OF KALAMAZOO, MICHIGAN.

SPRING.

Application filed October 1, 1923. Serial No. 666,016.

This invention relates to improvements in springs.

The main object of this invention is to provide a spring of the leaf or laminate type which is relatively flexible and at the same time one in which the return action is without the objectionable snap action frequently present in springs of this character.

A further object is to provide an improved leaf spring in which the spring members move freely one upon another, thereby securing uniform resiliency.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation of my improved spring, it being illustrated as mounted upon the axle of a motor vehicle.

Fig. II. is a detail longitudinal section on a line corresponding to line 2—2 of Fig. III.

Fig. III is a fragmentary plan view of the intermediate spring member of the embodiment shown in Fig. I.

In the drawing the similar reference numerals refer to similar parts throughout the several views.

Referring to the drawing, 1 represents the axle of a motor vehicle and 2 one of the side members of a motor vehicle frame. In the embodiment shown in Fig. I my improved spring comprises a bottom member 3 and an intermediate member 4 and a top member 5. The top member 5 is provided with eyes 5' at the ends thereof adapted to receive the spring shackle or other connections.

The bottom member 3 is adapted to fit upon the axle of a motor vehicle as 1 and is tapered toward each end, it having a central curved enlargement 6. The intermediate member 4 is also tapered toward each end and has a central upwardly curved offset 7 adapted to provide a seat engaging the enlargement 6. The top member 5 is provided with a curved offset 8 corresponding to the offset 7 and embracing the same. The U-bolts 9 embrace the spring members at the sides of these enlargements and offsets, thereby effectively securing the leaf members against relative longitudinal movement at this point.

The leaf member 4 is provided with a longitudinal recess 10 in its upper face adjacent its end forming a cage for the bearing rollers 11 which have journals 12 at their ends engaging the notches 13 at the sides of the recess. These bearing rollers are of such diameter as to support the superimposed spring member 5.

A lubricant pad 14 is arranged in the recess 10 as a lubricant storage or holding means, lubricant passages 15 extending from the ends of the spring member 4 to these recesses to facilitate replenishing the lubricant supply.

With the parts thus arranged I provide a structure which is very resilient and at the same time comparatively free from the snap or rebound which is frequently occasioned by the superimposed leaves of the spring sticking to each other or failing to slide freely as the spring flexes. Further, by tapering the intermediate spring member as shown in Fig. I the number of leaves is reduced and consequently the parts in bearing contact are reduced. This also results in reduction in weight.

I have illustrated and described embodiments or adaptations which I regard as very practical. I have not attempted to illustrate or describe certain modifications or adaptations which would be desirable in adapting my improvements to different types of springs, such as cantilever springs and the like, as I believe the disclosure made will enable those skilled in the art to which my invention relates to embody or adapt the same as may be desired.

Having thus described my invention what I claim as new and desire to secure by Letters Patent is:

1. A leaf spring comprising a bottom member tapered toward each end and having a central enlargement on its upper side and an intermediate member tapered toward each end and having a central offset curve to receive said enlargement, a top member of uniform thickness having a central curved offset to engage the curved offset of the intermediate member and having eyes at its ends, said intermediate member being provided with longitudinal recesses in its upper face constituting bearing cages, bearing rollers arranged in said cages in spaced relation to support the superimposed spring member, a lubricant pad arranged in said recesses, and U-clamping bolts embracing said spring members at each side of the said enlargement and offsets thereof.

2. A leaf spring comprising a bottom member tapered toward each end and having a central enlargement on its upper side and an intermediate member tapered toward each end and having a central offset curve to receive said enlargement, a top member of uniform thickness having a central curved offset to engage the curved offset of the intermediate member and having eyes at its ends, said intermediate member being provided with recesses in its upper face constituting bearing cages, bearing members arranged in said cages to support the superimposed spring member, and U-clamping bolts embracing said spring members at each side of the said enlargement and offsets thereof.

3. A leaf spring comprising a member of substantial thickness, tapered towards each end thereof, a superimposed member of uniform thickness from end to end having eyes at its ends, the lower member being provided with longitudinal recesses in its upper face constituting bearing cages, and bearing rollers arranged in said cages to support the superimposed spring member and provided with journals at their ends, said recesses being shouldered at each side to receive the journals.

In witness whereof, I have hereunto set my hand.

RAYMOND C. MORRIS.